J. G. HOPPER.
LUMINOUS INDICATING DEVICE FOR THE NIGHT LANDING OF AEROPLANES.
APPLICATION FILED AUG. 24, 1917.

1,356,285.   Patented Oct. 19, 1920.
2 SHEETS—SHEET 1.

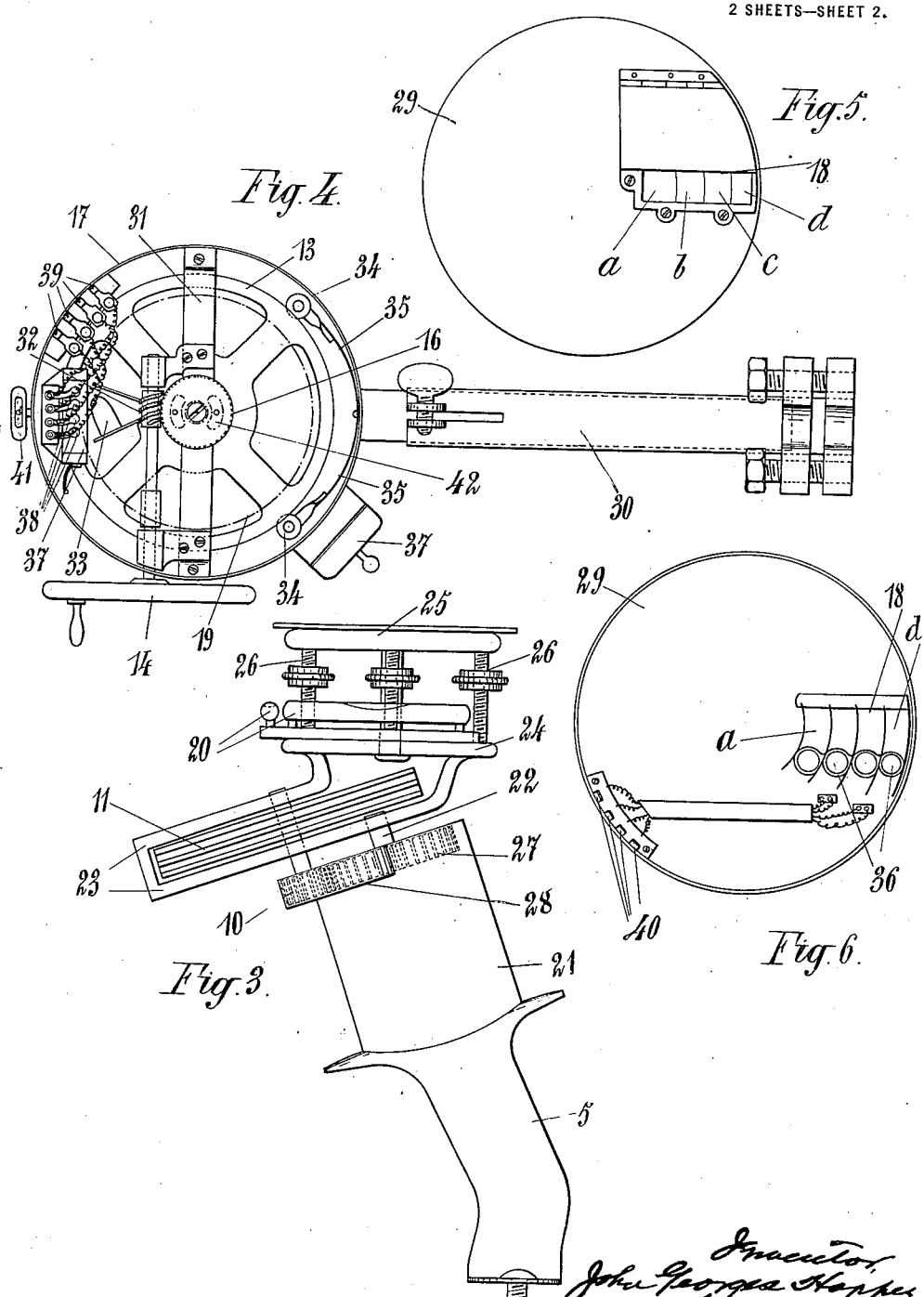

UNITED STATES PATENT OFFICE.

JOHN GEORGES HOPPER, OF NEUILLY-SUR-SEINE, FRANCE.

LUMINOUS INDICATING DEVICE FOR THE NIGHT LANDING OF AEROPLANES.

1,356,285. Specification of Letters Patent. Patented Oct. 19, 1920.

Application filed August 24, 1917. Serial No. 188,016.

*To all whom it may concern:*

Be it known that I, JOHN GEORGES HOPPER, citizen of the United States, residing at Neuilly-sur-Seine, in the Department of the Seine and State of France, have invented certain new and useful Improvements in Luminous Indicating Devices for the Night Landing of Aeroplanes, of which the following is a specification.

This invention relates to a luminous indicating device adapted to be used for the purpose of facilitating the night landing of aeroplanes or other aerial vehicles such as dirigible or other balloons. It is well known that in landing at night the chief difficulty resides in readily ascertaining at least approximately the height at which the aeroplane or like vehicle stands above the ground. It is also known that any error in computing said height or distance or the impossibility of securing this information may result in the most dangerous accidents.

This invention has for its object to remove said difficulty and to prevent the objectionable consequences therefrom by enabling the pilot to readily ascertain the distance between the aeroplane and the ground.

The invention consists mainly in a luminous height indicating device in which two light beams or pencils are directed from the aeroplane toward the ground one of said beams being stationary while the other, which is movable may be displaced until the luminous spot resulting from its interception by the ground covers the luminous spot produced on the ground by the stationary light beam, the distance or height of the aeroplane above the ground being derived from the value of the angle by which the movable beam has been displaced from a known position to obtain the superposition of both luminous spots and also from the known distance between the sources of the light beams on the aeroplane.

Figure 1:
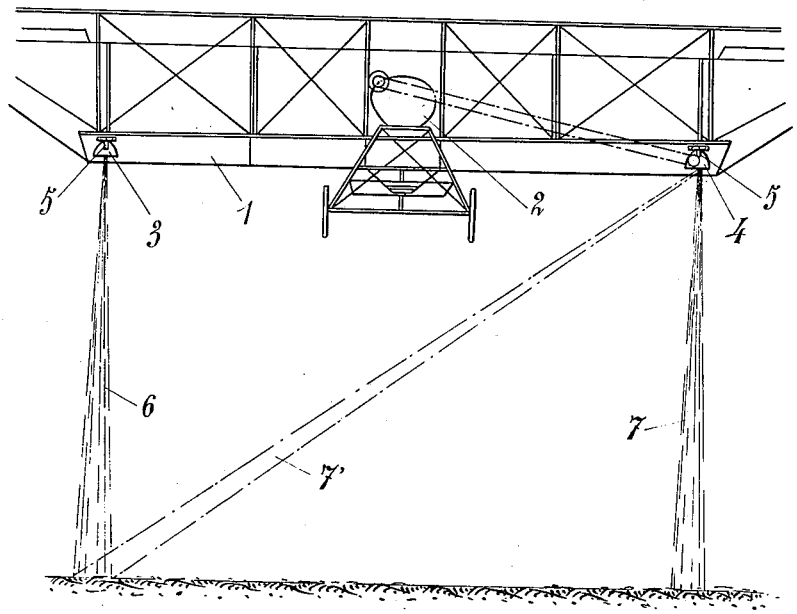
Figure 2:
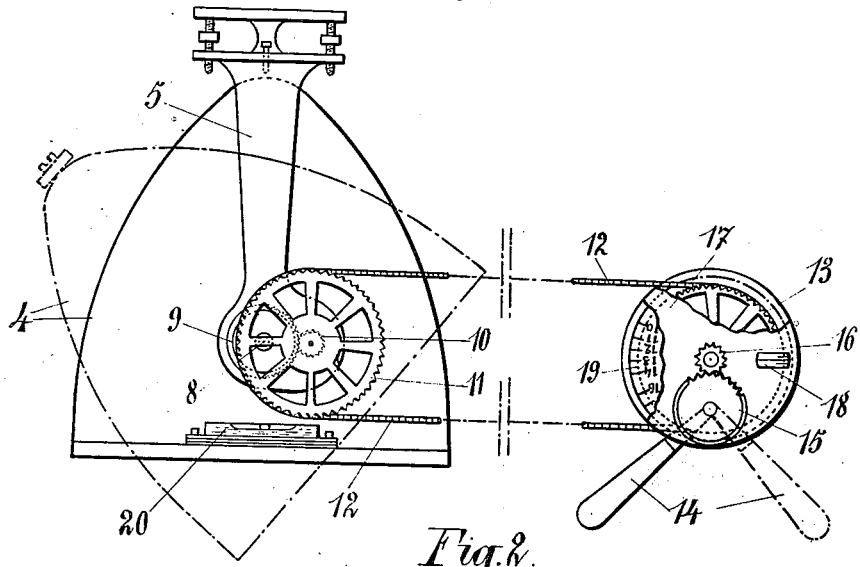

In the annexed drawings:

Figure 1 is a general view of a luminous height indicator constructed according to the invention arranged on a biplane, Fig. 2 is a detail view of the indicating apparatus itself, showing also the driving arrangement for the movable projector, Fig. 3 is a side elevation of an improved construction of carrier for the movable projector, Fig. 4 is a top view of an improved type of driving mechanism for the movable projector, the lid being removed, Fig. 5 is a top view of the lid, Fig. 6 is a view of the inside of the lid.

In Figs. 1 and 2, 1 indicates the bottom plane of the flying machine and 2 is the front part of the body or fuselage. Near each end of the plane 1, on the under surface of the same and preferably near its forward edge, are arranged two light projectors 3, 4, located at a known distance apart from each other and mounted in yokes or brackets 5 of any suitable type, said yokes or brackets being secured to the plane 1 by bolts or otherwise with or without adjusting means and provided with shock absorbing devices if necessary.

One of the projectors, for instance the projector 3, is rigidly mounted in its yoke 5 so that the stationary light beam 6 issuing therefrom is directed toward the ground at right angles to plane 1.

The other projector 4 is similarly arranged so that its light beam 7 when directed toward the ground perpendicularly to the plane 1 is parallel with the stationary beam 6, the vertical plane containing both light beams being parallel to the forward edge of plane 1.

The projector 4 is pivotally mounted in its yoke or bracket 5 so that the light beam 7 issuing therefrom may be displaced in the plane common to both beams and directed under variable inclinations for the purpose of intersecting the stationary beam 6.

The moving projector 4 is pointed in the desired direction by means of a driving mechanism which is also used as an indicating device. The arrangement of said mechanism is as follows, the projector 4 is mounted in the corresponding yoke 5 by means of trunnions 8 one of which carries a toothed wheel 11 supported by the yoke 5 and actuated through the medium of any suitable transmission member: cable, belt or endless chain 12, by means of a driving wheel 13 mounted within reach of the pilot's hand and operated itself by means of a hand lever 14 through the medium of a gearing 15, 16 giving a suitable speed increasing ratio.

The whole of the members 13, 15 and 16 is arranged in the inside of a casing 17 provided with an opening 18 through which a dial 19 may be observed, said dial rotating with the driving wheel 13 and carrying indications of the distance of the aeroplane above the ground, which indications appear behind the opening as the wheel 13 is rotated by means of the hand lever 14.

The luminous height indicator just described is used in the following manner in case of a night landing: both luminous beams 6 and 7 being parallel and directed toward the ground, it will only be necessary for ascertaining the desired distance or height, to displace the lever 14 so as to cause the luminous spot produced upon the ground by the movable beam 7 to cover the spot formed on the ground by the stationary beam 6, the movable beam 6 assuming then the direction indicated at 7'.

This result is obtained by means of the driving mechanism 14, 15, 16 and 13, the coupling member 12 and the gears 11, 10 and 9.

When both luminous spots produced by the beams 6 and 7 are thus superimposed on the ground, it only remains to read through the opening 18 on the dial 19 the desired information on the altitude at which the aeroplane is flying. The necessary measures for landing may then be taken, it being understood that an electric lamp or other lighting means is provided to illuminate the opening 18.

As an accessory part, each projector, which may be of any suitable type, may be provided with a spirit-level 20 whereby the verticality and the parallelism of its beam with respect to that of the other projector may be easily adjusted. Also, in order to limit the increase in the area of the spot formed on the ground by the movable beam 7 as said spot becomes ovalized as a result of the inclination of said beam, a compensating shutter may be provided on the movable projector to proportionately diminish the extent of the beam, so that the registering spots always cover the same area on the ground or nearly so.

With aeroplanes of certain types, the luminous spots formed on the ground by vertically directed light beams are not always readily vissible for the pilots and, for that reason and also for improving in a general way the carrying out of the invention, the luminous beams instead of being vertically projected on to the ground may be directed forwardly and inclined at an angle which is preferably of 30°, the stationary beam being still in a vertical plane parallel with the vertical plane passing through the longitudinal axis of the fuselage.

In this way, the luminous spots formed on the ground are located somewhat in front of the aeroplane and always in sight of the pilot. This inclination of the light beams in a forward direction enables also the pilot to notice and dodge any obstacles on the landing ground.

In this arrangement, the stationary projector 3 is somewhat inclined forwardly so as to give the beam the desired inclination. The movable projector 4 is so mounted that its light beam may describe a portion of a conical surface until the spot produced by it on the ground coincides with that formed by the forwardly inclined stationary beam. For this purpose, the yoke 5 which carries the movable projector 4 has a head 21 (Fig. 3) which is pivotally mounted by means of a stud 22 on a bracket 23 the ends of which are secured under a plate 24. The plate 24 is supported from a base plate 25 rigidly secured on the plane 1 of the flying machine. The plate 24 is connected to the base plate 25 by means of adjusting screws 26 which enable the plate 24 to be brought to the exact position desired; said position may thus be modified or adjusted at will; spirit levels 20 assist in effecting the adjustment.

The inclination of the axis of the yoke 5 carrying the projector results from the shape of the bracket 23 as shown in Fig. 3.

In the bracket 23, is mounted a grooved pulley 11, the shaft of which extends downwardly and carries the pinion 10 in mesh with a toothed sector 27 rigidly secured to the head 21 of the movable yoke 5. The whole gearing is inclosed in a casing 28 integral with the head 21 and protruding laterally therefrom. The casing 28 serves also to limit the rotation of the whole yoke and projector, a rotation of 90° from the right to the left being sufficient to cause the movable luminous beam, which is inclined forwardly to describe a portion of a conical surface and intersect the stationary light beam issuing from the other projector.

This movement of rotation is imparted at will by the pilot by means of the driving mechanism arranged within his reach and through the medium of the cable, chain or similar coupling member, 12, which passes in the groove of the pulley 11. A tensioning device of any suitable type may be used to keep the transmission taut and secure a proper working.

The driving mechanism may also be improved in the following manner. As shown in Fig. 4, it may comprise a round metal case 17 provided with a lid 29 and carried by an adjustable supporting arm or bracket 30 provided with locking jaws or straps.

At the bottom of the case 17, is mounted a grooved pulley 13 similar to pulley 11, the shaft of which is carried by a cross piece 31 and has keyed thereon a pinion 16 (shown in dotted lines) which is driven by a worm 32 operated by means of the hand wheel 14.

The rotation in both directions is calculated and limited to about 90° so as to correspond with the amount of rotation allowed to the yoke 5 of the movable projector. The motion of the pulley 13 to the right and to the left is resiliently stopped by a spring buffer 33.

To prevent the cable or chain 12 extending into the grooves of the pulleys 11 and 13 from running out, retaining rollers 34 may be provided, said rollers being mounted in any suitable way, and carried, for instance, by the ends of flexible blades 35 so as to hold the cable at the bottom of the peripheral groove of the pulleys.

Openings are provided in the inclosing case 17 for the passage of both bits or strands of the cable or chain 12.

The inclination of the light beams 6 and 7 being determined with the assumption of the machine being on even keel i. e. with its longitudinal axis in a horizontal plane, means are provided for correcting in the dark the errors resulting from the apparatus being inclined forwardly which is the normal position for landing, the angle of inclination being not as a rule in excess of 30°.

For this purpose, a luminous indicator is provided in the case 17, this indicator being visibble through the sight opening 18 of the lid 29 behind which rotates the dial 19, this dial rotating with the pulley 13 and carrying in yards or meters, the value of the desired distance corresponding to the position of the movable projector and the correcting tables as well.

The opening 18 is divided into sections, four for instance, shown at a, b, c, d, which correspond each to a certain number of degrees of inclination of the machine forwardly.

Each section is illuminated by a small electric bulb or glow lamp 36 and the latter are successively and automatically lit according to the amount of inclination of the flying machine in the forward direction. This device enables also the pilot to ascertain the inclination of the machine forwardly when landing.

The lighting of said electric bulbs is automatically effected by a quicksilver contacting device comprising a tube 37 having a somewhat curved shape and containing a drop of quicksilver which successively establishes the contact with contact pieces 38 suitably connected to contact blades 39. Connecting blades 40 carried by the lid and connected to the electric lamps 36 may engage the blades 39, the current being turned on or out by means of a switch 37ª of the knife type.

41 is a small spirit level which may be used for setting the tube 37 horizontally and at 42 are shown circular holes provided in the dial 19 for adjusting the same and turning it by any desired angle when corrections are to be made.

It will be understood that the invention is not limited to the modifications shown or described and that any changes may be imparted to the arrangements, combinations of parts or constructive details described without departing from the scope of the appended claims.

What I claim is:

1. The combination of an aerial vehicle with means adapted to project a luminous beam on to the ground in a fixed direction and means carried by the aerial vehicle at a known distance from the first mentioned means and adapted to project a luminous beam to be directed toward the luminous spot formed on the ground by said fixed luminous beam.

2. The combination of an aerial vehicle with a stationary projecting device carried by the aerial vehicle and adapted to project a luminous beam on to the ground in a fixed direction, a movable projecting device carried by the aerial vehicle at a known distance from the stationary projecting device and adapted to project a luminous beam on to the ground in a variable direction, and means whereby the movable projecting device may be so directed that the luminous spot formed on the ground by the light beam issuing therefrom may be caused to coincide with the luminous spot formed on the ground by the beam issuing from the stationary projecting device.

3. The combination of an aerial vehicle with a stationary projecting device carried by the aerial vehicle and adapted to project a luminous beam on to the ground in a fixed direction, a movable projecting device carried by the aerial vehicle at a known distance from the stationary projecting device and adapted to project a luminous beam on to the ground in a variable direction, toward and away from the first luminous beam, a driving mechanism arranged within reach of the pilot and operatively connected to the movable projecting device and means carried by said driving mechanism whereby the altitude of the aerial vehicle above the ground may be ascertained at a glance.

4. The combination of an aerial vehicle with a stationary projector and a pivotally mounted projector both mounted under the planes of the machine and at a known distance apart, a gearing operatively connected to the pivotally mounted projector, a driving mechanism arranged within reach of the pilot, coupling means operatively connected to the gearing and the driving mechanism, a dial operatively connected to the driving mechanism and having indicating marks inclosing the driving mechanism and provided with an opening through which the face of the dial may be observed.

5. The combination of an aerial vehicle with a stationary projecting device carried by the aerial vehicle and adapted to project a luminous beam on to the ground in a fixed, forwardly inclined direction and a movable projecting device carried by the aerial vehicle at a known distance from the stationary projecting device and adapted to project a luminous beam on to the ground toward and away from the first mentioned luminous beam and in a forwardly inclined direction.

6. The combination of an aerial vehicle with a stationary projecting device carried by the aerial vehicle and adapted to project a luminous beam on to the ground in a fixed, forwardly inclined direction, a movable projecting device located at a known distance from the stationary projecting device and adapted to project a luminous beam on to the ground toward and away from the first mentioned luminous beam, a forwardly inclined yoke carrying said movable projecting device, a pivot mounted on the aerial vehicle and around which said yoke may be rotated and means for rotating said yoke.

7. The combination of an aerial vehicle with a stationary projector carried by the aerial vehicle and adapted to project a luminous beam on to the ground in a fixed, forwardly inclined direction, a movable projector located at a known distance from the stationary projector and adapted to project a luminous beam on to the ground toward and away from the first mentioned luminous beam, a forwardly inclined yoke carrying said movable projector, a pivot mounted on the aerial vehicle and around which said yoke may be rotated, a toothed segment secured to the yoke, a pinion in mesh with said toothed segment, a pulley connected to the pinion and means for rotating said pulley.

8. The combination of an aerial vehicle with a stationary projector carried by the aerial vehicle and adapted to project a luminous beam on to the ground in a fixed direction, a movable projector carried by the aerial vehicle at a known distance from the stationary projector and adapted to project a luminous beam on to the ground toward and away from the first mentioned luminous beam, a pulley operatively connected to the movable projector, a second pulley, coupling means operatively connecting both pulleys, a worm gear connected to said second pulley, a driving hand wheel connected to the worm gear and resilient buffers for limiting the rotation of the second pulley to the right and to the left, the extent of said rotation being preferably of 90°.

9. The combination of an aerial vehicle with a stationary projector carried by the aeroplane and adapted to project a luminous beam on to the ground in a fixed direction, a movable projector carried by the aeroplane at a known distance from the stationary projector and adapted to project a luminous beam on to the ground toward and away from the first mentioned luminous beam, a driving mechanism arranged within reach of the pilot and operatively connected to the movable projector, said driving mechanism including a dial carrying different sets of information indicating the altitude of the aeroplane above the ground, each set corresponding to a definite longitudinal inclination of the aeroplane in the forward direction, a lid provided with an opening through which the different sets of information may be observed the opening being divided into sections corresponding each to one set of information, and means whereby the special sections of the opening corresponding to the actual longitudinal inclination of the aeroplane is automatically illuminated, substantially as described and for the purpose set forth.

10. The combination with an aerial vehicle, of a stationary projecting device carried on one portion of the vehicle and adapted to project a luminous beam in a definite direction with respect to the said vehicle, a second luminous beam projecting device pivotally mounted on said vehicle at a definite distance from the stationary projector for movement in a plane containing itself and the beam from the stationary projecting device, and means for shifting said second projecting device about its pivot.

11. The combination with an aerial vehicle, of a stationary projecting device carried on one portion of the vehicle and adapted to project a luminous beam in a definite direction with respect to the said vehicle, a second luminous beam projecting device pivotally mounted on said vehicle at a definite distance from the stationary projector for movement in a plane containing itself and the beam from the stationary projecting device, means for shifting said second projecting device about its pivot to cause the beams to intersect including a manually operated shifting member, and a scale for indicating directly by the extent of displacement of said member from a position where the beam from the second projecting device is parallel to the beam from the stationary projecting device, the distance from the vehicle to the intersection of the beams.

12. The method of determining the distance of an aerial vehicle from an object which consists in projecting beams of light in the same plane, upon the object from fixed positions on the vehicle, the direction of one of said beams being fixed with reference to the vehicle, maintaining said beam on the object and shifting the other of said beams in said plane until it intersects the first beam at the object, and indicating the distance of the vehicle from the object directly by the extent of the shifting of the movable beam away from a position in which it is parallel with the other beam.

In testimony whereof I affix my signature in presence of two witnesses.

JOHN GEORGES HOPPER.

Witnesses:
LUCIEN CRESPING,
CHAS. P. PRESSLY.